United States Patent [19]

Agulhon

[11] Patent Number: 4,680,188

[45] Date of Patent: Jul. 14, 1987

[54] PROCESS FOR IMPROVING THE TECHNICAL EFFICIENCY AND PRESERVATION QUALITY OF CANNED MUSHROOMS

[75] Inventor: Claude Agulhon, Varrains, France

[73] Assignee: Royal Champignon, Saumur, France

[21] Appl. No.: 852,392

[22] Filed: Apr. 15, 1986

Related U.S. Application Data

[63] Continuation of Ser. No. 505,013, Jun. 10, 1983, abandoned.

[30] Foreign Application Priority Data

Jun. 11, 1982 [FR] France ............................. 82 10373

[51] Int. Cl.⁴ ............................................. A23L 1/212
[52] U.S. Cl. .................................... 426/281; 426/324; 426/615
[58] Field of Search ............... 426/321, 324, 325, 331, 426/402, 404, 407, 486, 615, 262, 265, 281

[56] References Cited

U.S. PATENT DOCUMENTS

| | | |
|---|---|---|
| 1,637,068 | 6/1927 | Willison. |
| 2,728,676 | 12/1955 | Burt ........................................ 99/154 |
| 3,843,810 | 10/1974 | Fehmerling ........................ 426/615 |
| 3,857,979 | 12/1974 | Beauvais et al. ..................... 426/615 |
| 4,143,167 | 3/1979 | Blanchard et al. ................. 426/615 |
| 4,183,963 | 1/1980 | Brimelow et al. .................. 426/321 |
| 4,407,832 | 10/1984 | Ferguson et al. ................... 426/321 |
| 4,557,937 | 12/1985 | Bournier ............................. 426/302 |

FOREIGN PATENT DOCUMENTS

| | | |
|---|---|---|
| 0021629 | 1/1981 | European Pat. Off. ............ 426/407 |
| 2400848 | 4/1979 | France ................................ 426/321 |
| 2489097 | 3/1982 | France ................................ 426/615 |
| 6986178 | 3/1965 | United Kingdom ................ 426/404 |

OTHER PUBLICATIONS

Saburov et al., "Methods of Re-Working Mushrooms", Laboratory of Perishable Products, Apr. 4, 1931.

Primary Examiner—Raymond N. Jones
Assistant Examiner—Marianne M. Cintins
Attorney, Agent, or Firm—Fleit, Jacobson, Cohn & Price

[57] ABSTRACT

The present invention is concerned with a method for the improvement of the technical efficiency and of the quality of tinned mushrooms. This method is characterized by the fact that, in order to avoid blanching, the de-aeration of the mushrooms is achieved by treatment under a partial vacuum combined with an impregnation by means of a saline solution that makes a loss of water by osmosis possible.

7 Claims, No Drawings

PROCESS FOR IMPROVING THE TECHNICAL EFFICIENCY AND PRESERVATION QUALITY OF CANNED MUSHROOMS

This application is a continuation of application Ser. No. 505,013, filed June 10, 1983, now abandoned.

BACKGROUND OF THE INVENTION

1. Field of the Invention

The present invention is concerned with a method for the improvement of the technical efficiency and of the quality of tinned mushrooms, by means of blocking enzymatic oxidations before cooking.

2. Discussion of the Art

According to earlier technique, the mushrooms are generally subjected, before the sterilization procedure, to a blanching process that is intended to serve the following purposes:

to deaerate the mushrooms so as to prevent their oxidation, the bulging of the tins, and the appearance of "hobnails" when they are refrigerated;

to reduce the volume of the mushrooms, in such a way that such a quantity may be placed in the tins or jars that, after the process of sterilization, there will be the exact legal net drained weight, and to tenderize the texture of the mushrooms, so as to prevent any difficulties when filling the containers, such as the breakage of mushrooms or yet accidents at the time of the closing of the tins.

But, that classical technique of blanching the mushrooms entails a certain number of important disadvantages:

(a) During the course of this operation of blanching in water or in a flow of steam, the mushrooms may lose up to 45% of their dry weight; that explains a mediocre technical efficiency and a considerable loss of taste. The tinning experts know, moreover, that the so-called braising is more efficient technically and qualitatively, but constitutes a constricting bottle-neck during production. Moreover, that technique oxidizes the mushrooms much too much; they will, then, present an excessively deep coloring.

(b) In addition, blanching is an operation requiring much thermal energy.

(c) Blanching is a source of pollution. As a matter of fact, the main part of the biological oxygen requirement (B.O.R.) of a mushroom packing house is frequently linked with blanching, in particular with the fact that proteins or starch are liberated.

(d) The process of blanching is often accompanied by the use of chemical products that are tolerated only with difficulty or about to be prohibited by various national authorities.

In the earlier technique, there have already been suggested a certain number of methods that make it possible to avoid the practice of blanching. But, none of those methods makes it possible to bring about, at the same time, all the effects of a blanching process; in addition, these methods must always be accompanied by other treatments. One single treatment in vacuo makes it possible, e.g., to deaerate the mushrooms, but far from reducing their volume, this treatment has a tendency to increase it. For that reason, the required weight to obtain a sufficient net drained weight after sterilization cannot be contained in the receptacle.

SUMMARY OF THE INVENTION

In accordance with the present invention, with a view toward avoiding blanching, the deaeration of the mushrooms is achieved by treatment in a partial vacuum combined with impregnation with the aid of a saline solution, allowing a loss of water by osmosis. As a matter of fact, after the return to normal pressure, the osmotic balance is such that the net drained weight of the mushrooms will be equal, or at least very close, to the initial weight of the trimmed mushrooms. That equilibrium will be established following a rest period that varies in an inverse proportion to the salt concentration of the impregnating solution. The method that is the object of the present invention, makes it possible, therefore, to execute the following operations, one after the other:

deaeration and filling of the meatus of the mushrooms with the saline solution;
dehydration by osmotic action, and
consecutive increase of the density of the mushrooms.

The combination of those various effects which is the result of the method in accordance with the invention brings about the same result as a classic blanching operation, but with the folllwing additional advantages:

no—or practically no—loss of dry substance, and no loss of aromatic products due to the action of heat, inasmuch as heat occurs only when the receptacle is closed hermetically.

The carrying-out of the method that is the object of the present invention, makes it possible to obtain raw mushrooms that are enclosed hermetically within a small amount of water and cannot, for that reason, sustain any loss in the course of the cooking process. The migrations of soluble products in the cooking water are limited by the osmotic equilibrium achieved, e.g., between 500 g of raw mushrooms and 450 g of water. That means that the technical efficiency is excellent. That efficiency is that much higher since the mushrooms regain their turgidity once more after cooling. The method frees, as a matter of fact, salt in the pure dripping water and absorbs water without salt, so as to establish an osmotic equilibrium.

DETAILED DESCRIPTION OF THE INVENTION

A first way of carrying out the procedure that is the object of the present invention, consists in performing the following successive operations:

dressing (i.e., washing and peeling) the mushrooms;
passing the mushrooms kept in water through a partial vacuum;
returning the mushrooms to atmospheric pressure and letting them rest in said saline solution;
filling the tins, by volume or by weight, with the aid of the mushrooms treated as in the foregoing;
juicing (i.e., wetting or sprinkling with water) of the mushrooms, preferably with hot water, and
sterilization of the tins filled in that way.

In accordance with a variant of the method that is the object of the present invention, it is also possible to ensure the passing of the mushrooms through a partial vacuum immediately in said saline solution, while the other operations will remain unchanged, however. In the classical way, the first operation of the treatment, viz. the dressing of the mushrooms, may be performed manually or mechanically.

The passing of the mushrooms through a partial vacuum while they are kept in pure water or in a saline solution, is carried out under pressure that is lower than, approximately, 200 mm of mercury. In practice, the application of a partial pressure comprised between, approximately, 12 and, approximately, 15 mm of mercury produces perfectly satisfactory results, and in particular, a de-aeration that is perfectly effective. Following the return to atmospheric pressure, the phase of resting in the saline solution is pursued during a period that may vary, e.g., between some 30 minutes and some 12 hours. This rest period depends on the concentration of the saline solution. In practice, it is possible to have recourse to any type of saline solution whatever. Evidently, an aqueous solution of a salt that is acceptable from a nutritional point, will be used. Saline solutions of sodium chloride in a concentration of about 15 to about 60 g/l yield perfectly satisfactory results.

When a solution of sodium chloride in a concentration of 60 g/l is used, a rest period of some 30 minutes generally proves to be sufficient. When the concentration of the saline solution is reduced, it becomes necessary to extend the rest period of the mushrooms in the saline solution.

Following that resting stage in saline solution, one proceeds in the classical manner to the draining of the mushrooms, then to filling the tins, by volume or by weight, with the aid of the mushrooms so treated. In practice, the filling of the tins takes place, e.g., by weighing-in some 500 to some 550 g of mushrooms per 4/4 tin. Finally, the juicing of the mushrooms is performed, preferably with warm water.

In accordance with an additional characteristic of the present invention, the saline solution for the impregnation contains, in addition, citric acid in a concentration of about 1 g/l. In that case, the operation of juicing may be performed with pure water. On the other hand, when the saline solution for the impregnation does not contain any citric acid, it is possible to perform the operation of juicing by using hot water that is slightly acidified with 1 g/l of citric acid.

In the following, we shall report, by way of examples, a certain number of test results that illustrate the effect of deaeration and, then, of the concentration of salt, on the net weight of the mushrooms.

The mushrooms are impregnated in the saline solution under an absolute pressure of 12 mm of mercury. We record the evolution of the drained weight obtained from 1000 g of mushrooms after their stems have been cut off. The results are reported in Table I below:

TABLE I

| NaCl | P0 | P1 | P2 | P3 | P4 |
|---|---|---|---|---|---|
| 0 g/liter | 1000 | 1750 | 1800 | 1800 | 1810 |
| 5 g/l | 1000 | 1700 | 1700 | 1700 | 1050 |
| 10 g/l | 1000 | 1650 | 1570 | 1500 | 1050 |
| 20 g/l | 1000 | 1500 | 1320 | 1200 | 1050 |
| 40 g/l | 1000 | 1350 | 1150 | 1150 | 1050 |
| 80 g/l | 1000 | 1200 | 1050 | 1050 | 1050 |
| 160 g/l | 1000 | 1170 | 1000 | 1000 | 950 |
| 320 g/l | 1000 | 1100 | 950 | 950 | 900 |

P0 = original weight;
P1 = weight after impregnation;
P2 = weight 30 minutes later;
P3 = weight one hour later;
P4 = weight 12 hours later.

It will be noted that, in the case of saline concentrations of less than 80 g/l, a constant weight will be obtained at the end of a period that depends on the saline concentration. The supplementary 50 g correspond to the recovery of the weight lost due to evaporation during refrigerated storage.

COMPARATIVE EXAMPLE PERTAINING TO "CHAMPIGNONS DE PARIS", "SMALL WHITE" VARIETY

The mushrooms are dressed dry, for the convenience of the test calculations. The loss of weight due to dressing amounts to 20%; technical efficiency (r) will be expressed in the following manner:

$$r = \frac{PNE}{PB}$$

$$r = \frac{PNE}{1.25\, PC}$$

PNE = net drained weight after sterilization; PC = weight of the mushroom stems cut dry; PB = gross weight before dressing.

Beforehand, it will be noted that it is not possible to place more than 300 g of raw mushrooms into a 4/4 tin.

CONTROL TEST 1000 g of mushrooms are blanched during a period of 14 minutes at 97° C., in 4 liters of water. In that way, we obtain 750 g of blanched mushrooms. 475 g of mushrooms are packed in a 4/4 tin. Juicing is done with 15 g/l of salt and 1 g/l of citric acid. After sterilization, the drained net weight amounts to 460 g. The technical efficiency is, therefore, expressed in the following way:

$$r = \frac{750}{1250} \times \frac{460}{475} = 58\%.$$

TESTING BY APPLICATION OF THE METHOD IN ACCORDANCE WITH THE INVENTION 1000 g are soaked under a partial vacuum of 12 mm of mercury in a solution of sodium chloride in a concentration of 60 g/l, to which citric acid in a concentration of 1 g/l is added. Following passage through a vacuum, the weight P1 amounts to 1350 g. 30 minutes later, the weight amounts to no more than 1150 g and remains practically constant. The gain of 15% makes up for a considerable loss during cold storage, and that explains, by the way, the high efficiency of the control test.

We then fill a 4/4 tin volumetrically, which yields 570 g. Juicing is done with the aid of hot water.

The process of sterilization is carried out in the classical manner during the same period of time as in the case of the control tin, i.e., about 20 minutes at a temperature of 126° C.

In that way, we shall obtain a drained net weight of 470 g after sterilization.

The technical efficiency is, therefore, expressed as follows:

$$r = \frac{470}{1000 \times 1.15 \times \frac{570}{1150}} = 73.5\%.$$

The improvement of the technical efficiency is, therefore, highly significant in relation to the control, since it amounts to 73.5/58 or 26% by weight.

Of course, the present invention is not limited to the particular method of application as described above, but it is perfectly possible to image a certain number of variants thereof, without, for that reason, going outside the framework of the present invention.

I claim:

1. A process of canning mushrooms consisting essentially of steps (a) to (g) in the following order:
   (a) dressing the mushrooms and immersing the dressed mushrooms in an edible aqueous saline solution containing between about 15 g/l and 60 g/l of NaCl;
   (b) subjecting the immersed mushrooms to a reduced absolute pressure of between about 12 mm and 15 mm Hg for a time effective to deaerate the mushrooms;
   (c) increasing the pressure to about ambient pressure;
   (d) allowing the mushrooms immersed in said edible aqueous saline solution to stand at a temperature and for a period of time effective to attain a net drained weight within about 5% or less of the net drained weight of the mushrooms prior to dressing;
   (e) draining the mushrooms and placing the drained mushrooms in a can;
   (f) juicing the mushrooms with water; and
   (g) sealing the can; with the proviso that the mushrooms are not subjected to blanching.

2. The process of claim 1 wherein in step (f) the mushrooms are juiced in an edible aqueous solution.

3. The process of claim 2 wherein the edible aqueous solution of step (f) comprises about 1 g/l of citric acid.

4. The process of claim 1 wherein the edible aqueous saline solution of step (a) further comprises about 1 g/l of citric acid.

5. In a process for canning mushrooms by dressing the mushrooms, immersing the dressed mushrooms in water, subjecting the mushrooms to a partial reduced pressure, juicing the mushrooms, blanching the mushrooms, and canning the mushrooms in this order, the improvement wherein the blanching step is replaced by the following step conducted immediately after subjecting the mushrooms to reduced pressure;

placing the mushrooms at ambient pressure and allowing the mushrooms to stand in an edible aqueous saline solution containing between about 5 g/l and 60 g/l of NaCl at a temperature and for a period of time effective to attain a net drained weight within about 5% or less of the net drained weight of the mushrooms prior to dressing; and immediately thereafter juicing the mushrooms in water and canning them.

6. The process of claim 5 wherein the edible aqueous saline solution in which the mushrooms are allowed to stand further comprises about 1 g/l of citric acid.

7. The process of claim 5 wherein the mushrooms are juiced with an aqueous solution comprising about 1 g/l of citric acid.

* * * * *